A. F. ZAHM.
VIBRATION MEASURE.
APPLICATION FILED NOV. 17, 1916.
1,316,260.
Patented Sept. 16, 1919.
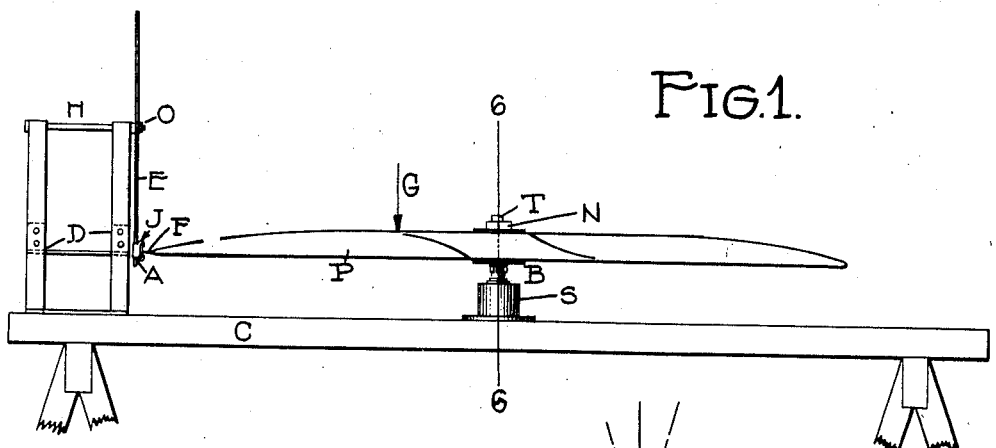
FIG.1.
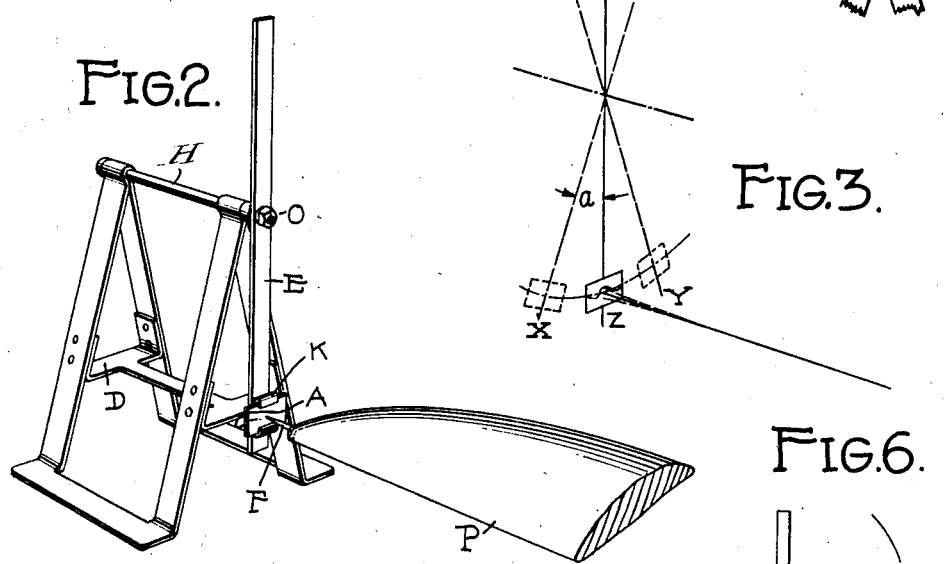
FIG.2.
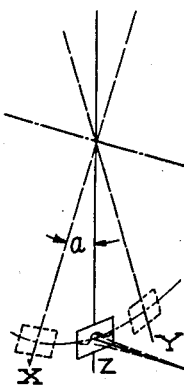
FIG.3.
FIG.6.
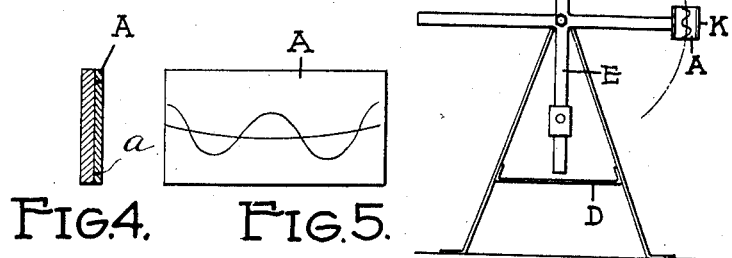
FIG.4. FIG.5.
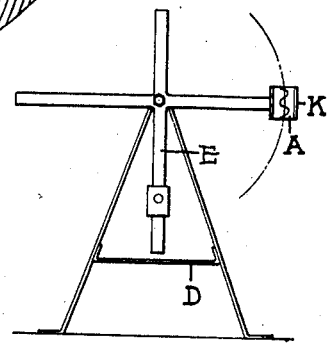
Inventor
ALBERT F. ZAHM.
By
Attorney

UNITED STATES PATENT OFFICE.

ALBERT F. ZAHM, OF BUFFALO, NEW YORK, ASSIGNOR TO CURTISS AEROPLANE AND MOTOR CORPORATION, A CORPORATION OF NEW YORK.

VIBRATION-MEASURE.

1,316,260.           Specification of Letters Patent.      Patented Sept. 16, 1919.

Application filed November 17, 1916. Serial No. 131,959.

*To all whom it may concern:*

Be it known that I, ALBERT F. ZAHM, a citizen of the United States, residing at Buffalo, in the county of Erie and State of New York, have invented certain new and useful Improvements in Vibration-Measures, of which the following is a specification.

My invention relates to that class of vibration measures designed particularly for determining the natural period of vibration of very large bodies. In the specific embodiment disclosed the body is that of an aerial propeller. I desire to have it understood, however, that even this specific embodiment may be so modified without departing in any wise from the generic spirit of the invention as to adapt it for use in measuring the natural periods of vibration of bodies of similar character. Aerial propellers are at this time generally made of wood. The wood is highly seasoned, the structure laminated and the blades themselves are subject to a variable pressure of the air rush in which the propeller operates and by means of which it derives its thrust. This variable pressure places the blade under considerable tension. At the same time the blade is subjected to a vibration due to the vibration, at various speeds of revolution, of the driving motor. It not infrequently happens that at some speed of the motor the imposed vibrations are in harmony with the natural period of the propeller itself with the result that the blade, already flexed under its driving load, is placed immediately in its fundamental vibration, the amplitude of which is soon driven to its mechanism by opening the approach to or actually reaching out to the state of resonance between the motor vibration and the propeller vibration. Under these conditions there are set up in the blade complex strains of a very severe character which have been known in a number of instances to crack the propeller blade and in numerous others to split it wide open. The moment the pressures and weights are unequalized, centrifugal action and the unbalanced condition result in entire destruction. The sequence of causes and effects is probably not the same in all instances but in general it may be said that the blade is initially cracked or split due either to the vibration or the unequal distribution of pressures incident to vibration whereupon the pressures are still further distributed and in turn so distort the blade that centrifugal forces accompanied by continued violent vibration completes the wreck.

By determining the natural period of the propeller in advance and regulating this natural period so that it differs from the period of motor vibration within the usual motor speed ranges, all of these difficulties can be effectually eliminated. The determination of this natural period and its adjustment is effected through the use of the instrument of my invention.

Broadly speaking, my invention comprises a rigid base member elongated in form and of such mass and rigidity that its period of vibration is far removed from the period of vibration of the propeller under test. Clamping means are associated with this base and adapted to clamp the propeller at its hub to the base with a rigidity approximating that with which the propeller itself is clamped to the driving shaft of the motor. Also mounted on the same base and removed from the clamping means is an elevated structure adjustable to and from the clamping means aforesaid so as to accommodate propellers of various diameters. Supported from this structure is a timing and recording element in the specific embodiment disclosed in the form of a pendulum arranged to vibrate freely in the plane at right angles to the axis of a propeller clamped to the base. A recording element is fixed to the propeller in such a manner as to partake of all forced vibration in synchronism with the natural period thereof and a record surface is carried by the timing element in juxtaposition thereto so that there is traced thereon the record of vibration in the course of the travel of the timing element past the tip of the vibrating blade.

Figure 1 is a side elevation of the vibration measuring machine showing the relation of the propeller to the measuring elements;

Fig. 2 is a perspective view on an enlarged scale;

Fig. 3 is a perspective diagrammatic view illustrating the operation;

Fig. 4 is a section showing the waxed plate upon which the record is made;

Fig. 5 is a face view of the plate after record has been traced.

Fig. 6 is a modified form of pendulum and support.

In Fig. 1, C is a base constructed of sufficient mass and rigidity that it is not subject to any of the vibrations which may come to it through the vibration of the other elements of the machine. To this base C is rigidly fastened the pedestal S which supports the propeller by its hub B. At the end of the base C is a frame D which may be adjusted along C for propellers of various lengths. At the upper part of the frame D is a bolt H which forms the pivotal point O from the pendulum E. At the lower end of the pendulum E is a waxed plate A which is attached thereto by means of a suitable socket K. The pendulum is so arranged at the pivotal point O that it may be varied in length to bring the parts into proper relationship. F is a pointer which is securely fastened to the tip of the propeller by embedding in the wood thereof or by other suitable means; so that the pointer has no vibration period of its own but partakes of that of the propeller.

The operation of the vibration measuring machine is as follows. The propeller P is securely clamped by its hub B to the pedestal S by a suitable clamping device such as trunnion T and nut N (Fig. 1) and in such a position that the axis of the blades is perpendicular to the waxed plate A. The plate A is waxed over its surface and smoothed off to present a perfectly plane surface on which the record is to be traced and fastened in the socket K. This waxed surface is conveniently formed by pouring on a perfectly plain table such as that formed by a piece of plate glass and thereafter attached to plate A by sticking upon pins $a$, projecting from the face of the plate itself. The frame D is so adjusted along C that the waxed plate A makes contact with the pointer F. Pendulum E is swung to a known position X (Fig. 3) through an angle $a$ degrees from the vertical line through O and F where it is held by hand or suitable stops. Vibrations are set up in the propeller blade by striking at a point G which has been so determined that fundamental vibrations are induced by the blow.

The propeller having been set into vibration the pendulum is released and in describing the arc XZY the pointer F traces a curve or record of vibration upon the waxed surface A. The pendulum is stopped at the point Y in order that the record may not become marred due to the decreasing amplitude of the propeller vibrations and to possible asynchronism of the superposed record.

The time required for the surface to pass the pointer may be computed from the law of the pendulum which gives the time of a single oscillation as represented by the relation $t = \pi\sqrt{\dfrac{l}{g}}$ wherein $t$ is time in seconds. $l$ is pendulum length in centimeters and $g$ is the value of the acceleration of gravity. The relationship is true only when the amplitude of vibration of the pendulum is comparatively small. The length of arc through which the pendulum swings is calculated from the angle $a$ before mentioned.

The above data is sufficient for computing the time required for the pendulum E to pass the pointer F.

The number of vibrations of the propeller represented by the curve traced upon the surface A are counted, hence from this data the vibration period of the propeller is computed.

In case it is desired to obtain the vibration period of the propeller taken in conjunction with the motor, engine beds, etc., the pendulum and support as shown in Fig. 6 are used. The propeller is mounted directly upon the motor crankshaft extremity in its operating position, and placed preferably in a horizontal position. The pendulum support of Fig. 6 is then rigidly mounted in such position that its waxed record surface can contact with the pointer carried by the vibrating propeller tip. The modified form of pendulum is necessary by reason of the fact that the propeller is vibrating in a horizontal plane when mounted in this position.

What I claim is:

1. An apparatus for measuring the vibration of heavy bodies comprising a rigid base of considerable mass having a period of vibration removed from that of the member whose vibration rate is to be determined, a clamping device rigidly connected with said base and adapted to clamp the member thereto, a timing device also supported from said base in coöperative relation with said member, and arranged to travel in a plane at right angles to a radius line passing through said clamp and a recording means carried by one of said coöperative members.

2. An apparatus for measuring the natural period of vibration of propellers, comprising a rigid base of considerable mass having a rate of vibration removed from that of the propeller whose vibration is to be measured, a pedestal rigidly secured to said base and having clamping connections for securing the propeller to the base, the rigidity of which approximates that of the driving shaft connections through which the propeller is arranged to be driven when in use, and a timing element rigidly mounted with respect to said base and arranged to travel in a plane at right angles to the radius of vibration of a point on said propeller whereby said point may trace upon said timing element a sinuous record of the vibrations thereof.

3. An apparatus for measuring the natural period of vibration of propellers, comprising a rigid base of considerable mass having a rate of vibration removed from that of the propeller whose vibration is to be measured, a pedestal rigidly secured to said base and having clamping connections for securing the propeller to the base, the rigidity of which approximates that of the driving shaft connections through which the propeller is arranged to be driven when in use, a vibration measuring means mounted rigidly with respect to said base and arranged in juxtaposition to said blade, said means comprising a pendulum adapted to swing past said blade, whereby the rate of vibration of the blade is indicated thereon.

4. An instrument apparatus for measuring the natural period of vibration of propellers, comprising a rigid base, clamping means rigidly connected with said base and arranged to clamp the propeller to be tested rigidly thereto, together with a vibration measuring apparatus, adjustable readily toward and from said clamping device whereby propellers of different diameters may be readily accommodated.

5. In an apparatus for measuring the natural period of vibration of propellers, in combination, a rigid base, a clamping device for propellers rigidly connected therewith, together with a vibration measure having an element arranged to coöperate with the vibrating tip of the propeller and adjustable vertically of said base whereby it may coöperate with portions of propellers located at different elevations, one of said coöperating members carrying a recording surface.

6. In an apparatus for measuring the natural period of vibration of a body, the combination of a support for the body whose vibrations are to be measured with a pendulum adapted to swing in the path of a recording instrument carried by the body, said pendulum carrying a recording surface which is operated upon by said vibration recording instrument, whereby the natural period of the body may be determined from the record made and the natural law of the pendulum.

7. In an apparatus for measuring the natural period of vibration of a body, the combination of a support for a body whose vibrations are to be measured with a pendulum adapted to swing in the path of a recording instrument carried by the body, said pendulum carrying a removable recording surface which is operated upon by said vibrating recording instrument, whereby the natural period may be determined from the record made and the natural law of the pendulum.

In testimony whereof I affix my signature.

ALBERT F. ZAHM.